US009608496B2

(12) United States Patent
    Ahn et al.

(10) Patent No.: US 9,608,496 B2
(45) Date of Patent: Mar. 28, 2017

(54) REACTION FORCE COMPENSATION DEVICE

(71) Applicant: Foundation of Soongsil University-Industry Cooperation, Seoul (KR)

(72) Inventors: Hyeong-Joon Ahn, Seoul (KR); Kyoung-Rock Kim, Gyeonggi-do (KR); Dong-Jun Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 492 days.

(21) Appl. No.: 14/091,950

(22) Filed: Nov. 27, 2013

(65) Prior Publication Data

US 2014/0197706 A1    Jul. 17, 2014

Related U.S. Application Data

(60) Provisional application No. 61/738,779, filed on Dec. 18, 2012.

(30) Foreign Application Priority Data

Nov. 29, 2012 (KR) ........................ 10-2012-0136944

(51) Int. Cl.
    *H02K 7/00*   (2006.01)
    *H02K 5/00*   (2006.01)
    (Continued)

(52) U.S. Cl.
    CPC ............... *H02K 7/104* (2013.01); *H02K 5/24* (2013.01)

(58) Field of Classification Search
    CPC ........ H02K 7/104; H02K 5/24; H02K 16/025; G02B 26/105; G03B 37/02
    (Continued)

(56) References Cited

U.S. PATENT DOCUMENTS 2,172,410 A * 9/1939 Riggs ..................... G05D 3/122
                                                        318/616
3,613,450 A * 10/1971 Bodge ....................... G01F 1/80
                                                      73/861.351

(Continued)

FOREIGN PATENT DOCUMENTS

KR    10-2012-0047187 A    5/2012
KR       10-1238855 B1     3/2013

OTHER PUBLICATIONS

English machine translation of KR20110023329; Mar. 2011; Cho et al.*

*Primary Examiner* — Terrance Kenerly
*Assistant Examiner* — Ahmed Elnakib
(74) *Attorney, Agent, or Firm* — Novick, Kim & Lee, PLLC; Sang Ho Lee

(57) ABSTRACT

Provided is a reaction force compensation device capable of compensating for a reaction force caused by a motor that is continuously rotating. The reaction force compensation device is configured to compensate for a reaction force generated when a motor including a stator and a rotor, which is combined with the stator to be rotatable, is driven, and includes a housing disposed below the motor, and a rotation support member disposed between the housing and the rotor and configured to support the stator to be rotatable with respect to the housing. The stator rotates by a reaction force generated when the rotor rotates.

4 Claims, 2 Drawing Sheets

(51) Int. Cl.
 *H02K 23/66* (2006.01)
 *H02K 7/104* (2006.01)
 *H02K 5/24* (2006.01)

(58) Field of Classification Search
 USPC ..... 310/91, 112, 114, 74, 115, 68 B; 318/48, 318/376
 See application file for complete search history.

(56) References Cited

U.S. PATENT DOCUMENTS

| | | | | |
|---|---|---|---|---|
| 4,373,147 A | * | 2/1983 | Carlson, Jr. .......... | H02K 16/025 310/112 |
| 4,874,998 A | * | 10/1989 | Hollis, Jr. ................ | B23Q 5/28 310/166 |
| 2005/0067908 A1 | * | 3/2005 | Nai ........................ | H02K 23/04 310/112 |

* cited by examiner

REACTION FORCE COMPENSATION DEVICE

CROSS-REFERENCE TO RELATED APPLICATION

This application claims priority to and the benefit of Korean Application No. 10-2012-0136944 filed on Nov. 29, 2012 and U.S. Application No. 61/738,779, filed on Dec. 18, 2012, which applications are incorporated herein by reference.

TECHNICAL FIELD

The present invention relates to a reaction force compensation device, and more particularly, to a device capable of compensating for a reaction force caused by a motor that is rotating.

RELATED ART

A device capable of compensating for a reaction force applied to a linear motion device, e.g., a linear motor, has been disclosed in Korean Patent Laid-Open Publication No. 10-2011-0023329. It has been suggested that the structure of the conventional device is configured such that a reaction force generated when a linear motor is driven is compensated for by using a spring or an eddy current damper.

However, such a conventional reaction force compensation structure cannot be applied to a motor that is rotating since continuous rotation of the motor should be secured. Until now, no device capable of compensating for a reaction force caused by a motor that is rotating has been suggested. Accordingly, there is a need to develop a device capable of efficiently compensating for a reaction force caused by a motor that is rotating.

SUMMARY

To address this problem, the present invention is directed to a reaction force compensation device capable of compensating for a reaction force caused by a motor that is continuously rotating.

According to an aspect of the present invention, there is provided a reaction force compensation device for compensating for a reaction force generated when a motor, which includes a stator and a rotor combined with the stator to be rotatable, is driven, the device including a housing disposed below the motor, and a rotation support member disposed between the housing and the stator, and configured to support the stator to be rotatable with respect to the housing. The stator rotates by a reaction force generated when the rotor rotates.

The reaction force compensation device may further include a stator rotation sensor configured to measure a degree of rotation of the stator; and a rotor rotation sensor configured to measure a degree of rotation of the rotor.

The reaction force compensation device may further include a conducting plate combined with one of the stator and the housing, and a permanent magnet or an electromagnet combined with the other of the stator and the housing.

The reaction force compensation device may further include a control device configured to compare the degree of rotation of the stator and the degree of rotation of the rotor with each other, and control an output of the electromagnet based on a result of the comparing.

The reaction force compensation device may further include an additional mass member combined with the stator to rotate together with the stator.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Reaction force compensation devices according to exemplary embodiments of the present invention will be described in detail below with reference to the accompanying drawings.

Figure 1:
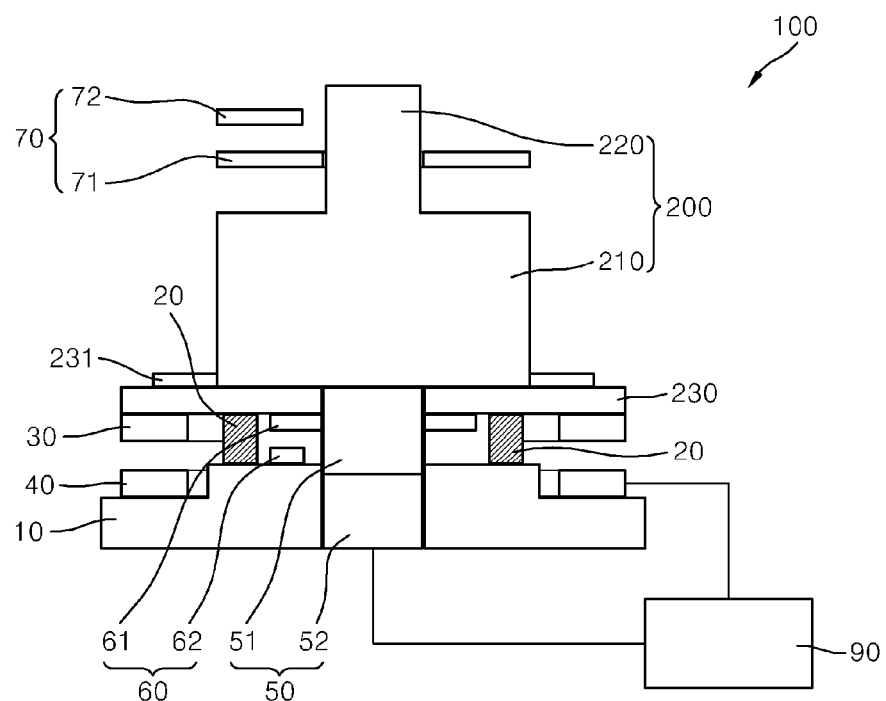
FIG. 1 is a schematic configuration diagram of a reaction force compensation device according to an embodiment of the present invention.
Figure 2:
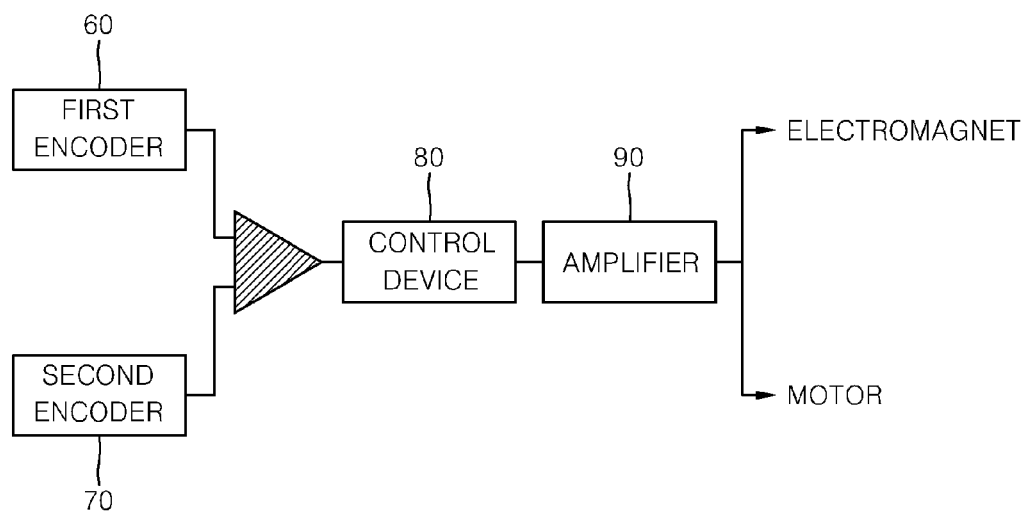
FIG. 2 is a block diagram of a process of operating the reaction force compensation device of FIG. 1.

FIG. 1 is a schematic configuration diagram of a reaction force compensation device 100 according to an embodiment of the present invention. FIG. 2 is a block diagram of a process of operating the reaction force compensation device 100 of FIG. 1.

Referring to FIGS. 1 and 2, a motor 200 includes a stator 210, and a rotor 220 combined with the stator 210 to be rotatable. Also, the motor 200 is combined with a motor case 230 that covers the motor 200. For convenience of explanation, although FIG. 1 illustrates the motor case 230 that has a flat panel shape, in general, the motor case 230 may be configured to cover the entire stator 210. A power supply terminal 231 is placed on the motor case 230 to supply power to the motor 200.

The reaction force compensation device 100 according to the current embodiment includes a housing 10, a rotation support member 20, an eddy current damper, a stator rotation sensor 60, a rotor rotation sensor 70, and a control device 80.

The housing 10 is configured to support the motor 200 and is installed on a base of a machine or the like. In the current embodiment, a through-hole is formed in the housing 10, and a rotation connection terminal 52 is installed in the through-hole as will be described below.

The rotation support member 20 supports the motor 200 such that the stator 210 of the motor 200 is supported to be freely rotatable. For example, a ball bearing may be used as the rotation support member 20. The rotation support member 20 is disposed between the stator 210 and the housing 10, and more particularly, between the motor case 230 and the housing 10 to support the motor case 230. In this case, as illustrated in FIG. 1, a plurality of the rotation support members 20 may be installed in a circumferential direction.

The eddy current damper is configured to compensate for a reaction force generated when the rotor 220 rotates, and includes a conducting plate 30 and a magnet. In this case, the magnet may be a permanent magnet or an electromagnet. In the current embodiment, an electromagnet 40 is used as the magnet. The conducting plate 30 is combined with one of the stator 210 of the motor 200 (more particularly, the motor case 230) and the housing 10, and the electromagnet 40 is combined with one of the stator 210 and the housing 10. In the current embodiment, the conducting plate 30 is combined with the motor case 230, and the electromagnet 40 is combined with the housing 10. As will be described below, when the motor case 230 rotates together with the stator 210 of the motor 200 due to a reaction force generated when the rotor 220 rotates, a magnetic flux (which is formed by the electromagnet 40) passing through the conducting plate 30 changes. Thus, induced current flows through the conducting plate 30, and at the same time, the reaction force (rotary power of the motor case 230) decreases due to an electromagnetic force.

The stator rotation sensor 60 measures a degree of rotation of the stator 210. The stator rotation sensor 60 may be embodied as an encoder (first encoder) including a rotating plate 61 and a photo sensor 62. The configuration of the encoder and a principle of measuring the degree of rotation of the stator 210 have already been known, and thus details thereof will not be described here.

The rotor rotation sensor 70 measures a degree of rotation of the rotor 220, and may be embodied as an encoder (second encoder).

Also, a power supply member 50 is installed to supply power to the motor 200. In the current embodiment, the power supply member 50 includes a fixed connection terminal 51 and the rotation connection terminal 52. The fixed connection terminal 51 is combined with the motor case 230 to rotate together with the motor case 230. The fixed connection terminal 51 is electrically connected to the power supply terminal 231 placed on the motor case 230. The rotation connection terminal 52 is fixedly installed in the housing 10, thereby causing a relative rotation (slip) to occur between the fixed connection terminal 51 and the rotation connection terminal 52. The rotation connection terminal 52 is electrically connected to the fixed connection terminal 51 so as to supply power to the fixed connection terminal 51. A mechanism, such as a slip ring, has been known as a system for supplying power using devices that rotate relative to each other.

The control device 80 receives a signal regarding the degrees of rotation of the stator 210 and the rotor 220 from the stator rotation sensor (first encoder) 60 and the rotor rotation sensor (second encoder) 70, respectively. The control device 80 calculates a reaction force to be delivered to the stator 210 by comparing the degree of rotation of the stator 210 with the degree of rotation of the rotor 220, and controls an amount of power to be applied to the electromagnet 40 and the motor 200 based on the calculated reaction force, thereby appropriately compensating for the reaction force.

A principle of operating the reaction force compensation device 100 configured as described above will now be described.

First, when the rotor 220 of the motor 200 rotates, a reaction force caused by the rotation of the rotor 220 is delivered to the stator 210 of the motor 200. Due to the delivered reaction force, the stator 210 of the motor 200 and the motor case 230 rotate (in a direction opposite to the direction in which the rotor 220 rotates). Since the reaction force is used in this process, i.e., to rotate the stator 210 of the motor 200 and the motor case 230, the reaction force to be delivered to the housing 10 is consequently reduced mostly.

Also, when the rotor 220 and the stator 210 rotate, the degrees of rotation of the rotor 220 and the stator 210 are measured and a signal regarding the degrees of rotation is transmitted to the control device 80. The control device 80 calculates the intensity of the reaction force that is being generated by comparing and analyzing the degrees of rotation measured. For example, that the degree of rotation of the stator 210 is high means that the reaction force that causes the stator 210 to rotate is generated highly. Also, the control device 80 delivers a control signal to an amplifier 90, and an amount of power that is to be applied to the electromagnet 40 and the motor 200 is controlled according to the delivered control signal. For example, when the reaction force is high and should be thus actively compensated for, an output of the electromagnet 40 may be increased to increase the degree of compensating for the reaction force caused by a reduction in the intensity of eddy current. In contrast, the degree of compensating for the reaction force caused by the reduction in the eddy current may be reduced by reducing the output of the electromagnet 40.

As described above, according to the current embodiment, a reaction force generated when the rotor 220 rotates is mostly used to rotate the stator 210 and the motor case 230. Thus, the reaction force that is to be delivered to the housing 100 and a base of a machine combined with the housing 100 is reduced to a great extent.

Furthermore, the reaction force may be compensated for in a tracking manner by using the eddy current damper. In this case, the intensity of a damping force may be controlled by controlling an output of the electromagnet 40, thereby actively compensating for the reaction force.

Alternatively, a permanent magnet may be installed instead of the electromagnet 40. In this case, since a magnetic flux is fixed when the permanent magnet is used, the reaction force cannot be actively compensated for and is thus compensated for according to a passive method in which the damping force is determined by the degree of rotation of the stator 210.

Figure 3:
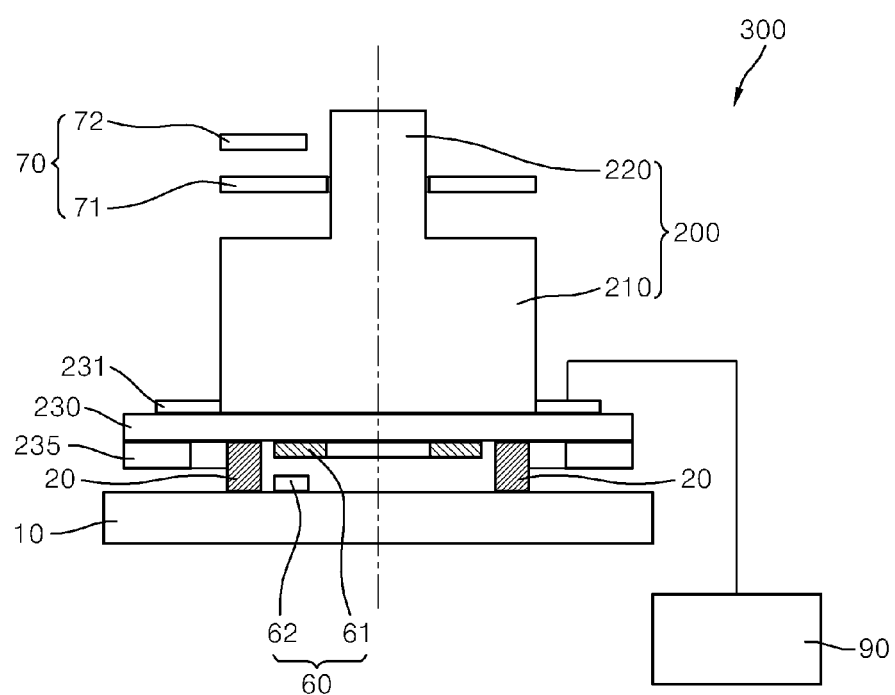
FIG. 3 is a schematic configuration diagram of a reaction force compensation device according to another embodiment of the present invention.

FIG. 3 is a schematic configuration diagram of a reaction force compensation device 300 according to another embodiment of the present invention.

Referring to FIG. 3, the reaction force compensation device 300 according to the current embodiment includes a housing 10, a rotation support member 20, an additional mass member 235, a stator rotation sensor 60, a rotor rotation sensor 70, and a control device.

The housing 10 is configured to support a motor 200, and is installed on a base of a machine (not shown) or the like. In the current embodiment, a through-hole is not formed in the housing 100 unlike in the previous embodiment.

The rotation support member 20 supports the motor 200 such that a stator 210 of the motor 200 is supported to be freely rotatable. The rotation support member 20 may be embodied as a ball bearing or the like. The rotation support member 20 is disposed between the stator 210 of the motor 200 and the housing 100, and more particularly, between a motor case 230 and the housing 10, and supports the motor case 230. As illustrated in FIG. 3, a plurality of the rotation support members 20 may be installed in a circumferential direction.

The additional mass member 235 is manufactured in the form of a loop-shaped plate, and is combined with the motor case 230. As described above, the stator 210 and the motor case 230 rotate by a reaction force generated when a rotor 220 rotates. In this case, since the additional mass member 235 is combined with the motor case 230, a total mass of the elements rotating by the reaction force increases to reduce the reaction force to a greater extent.

The stator rotation sensor 60 measures the degree of rotation of the stator 210, and may be embodied as an encoder (first encoder) including a rotating plate 61 and a photo sensor 62.

The rotor rotation sensor 70 measures the degree of rotation of the rotor 220 and may be embodied as an encoder (second encoder).

In the previous embodiment, power is supplied to the motor 200 using the fixed connection terminal 51 and the rotation connection terminal 52, whereas in the current embodiment, a coil (not shown) is directly connected to a power supply terminal 231 of the motor case 230 so as to supply power to the motor 200. In this case, as the stator 210 and the motor case 230 rotate, the motor case 230 may be wound by the coil. However, when in the current embodiment, the motor case 230 is combined with the additional mass member 235 having an appropriate size, an inertia mass increases to reduce the degree of rotation of the motor case 230 rotated by the reaction force. Furthermore, since the coil has hardness itself, the motor case 230 is expected to be prevented from being wound by the coil.

Furthermore, although not shown in FIG. 3, an eddy current damper including a conducting plate and a magnet (permanent magnet or electromagnet) may further be installed as in the previous embodiment. In this case, the degree of rotation of the motor case 230 is controlled by the inertia mass, the hardness of the coil, and the eddy current damper.

The control device receives information regarding the degrees of rotation of the stator 210 and the rotor 220 from the stator rotation sensor (first encoder) 60 and the rotor rotation sensor (second encoder) 70, respectively. The control device calculates a reaction force that is to be applied to the stator 210 by comparing and analyzing the degrees of rotation of the stator 210 and the rotor 220, and controls an amount of power to be applied to the magnet, e.g., the electromagnet, based on the calculated reaction force.

According to the current embodiment, a reaction force may be compensated for without using a rotation connection terminal (slip ring), the electromagnet, or the like, thereby simplifying a device structure and reducing manufacturing costs.

According to the above embodiments of the present invention, a reaction force caused by a motor that is rotating may be effectively reduced according to a passive/active method.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A reaction force compensation device, the device comprising:
   a motor comprising a stator and a rotor, wherein the rotor is rotatably combined with the stator;
   a housing disposed below the motor;
   a rotation support member rotatably disposed between the housing and the stator, wherein the stator is rotatably supported on the rotation support member;
   an eddy current damper comprising an electromagnet disposed on one of the stator or the housing to induce an eddy current in a conducting plate, the conducting plate conducting an eddy current and disposed on the other of the one of the stator or the housing; and
   a control device comparing a rotation of the stator with a rotation of the rotor and providing a comparison result thereof,
   wherein:
   the rotation of the stator is caused by the reaction force generated from the rotation of the rotor,
   the control device controlling an input of the electromagnet in proportion to the comparison result to compensate the reaction force, and
   the compensating the reaction force is affected by the eddy current.

2. The reaction force compensation device of claim 1, further comprising:
   a stator rotation sensor measuring a degree of the rotation of the stator; and
   a rotor rotation sensor measuring a degree of the rotation of the rotor.

3. The reaction force compensation device of claim 2, wherein
   the electromagnet is combined with the other of the stator and the housing.

4. The reaction force compensation device of claim 2, further comprising an additional mass member attached to the stator, wherein the additional mass member and the stator rotate together.

* * * * *